Figure 1:
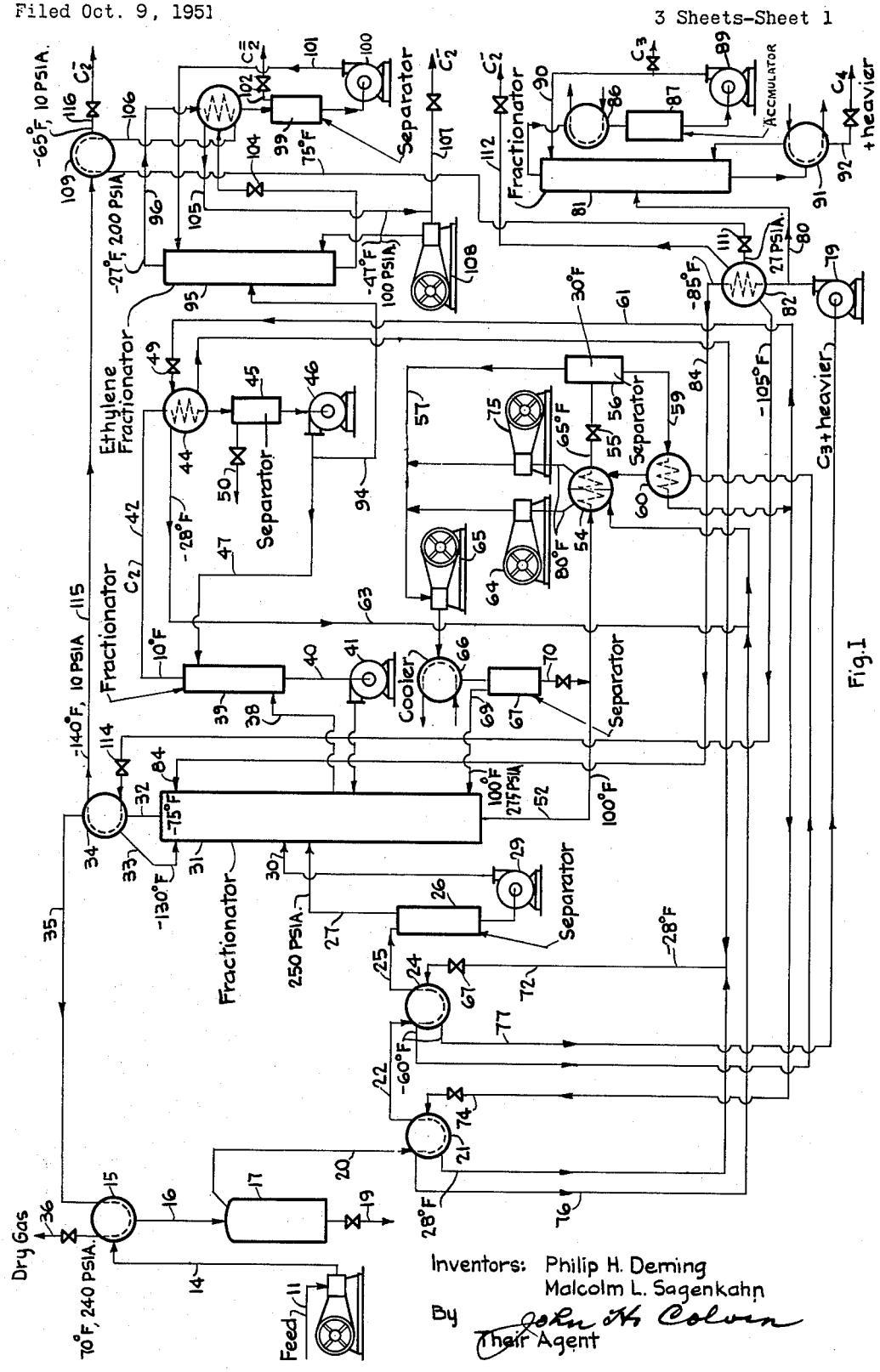

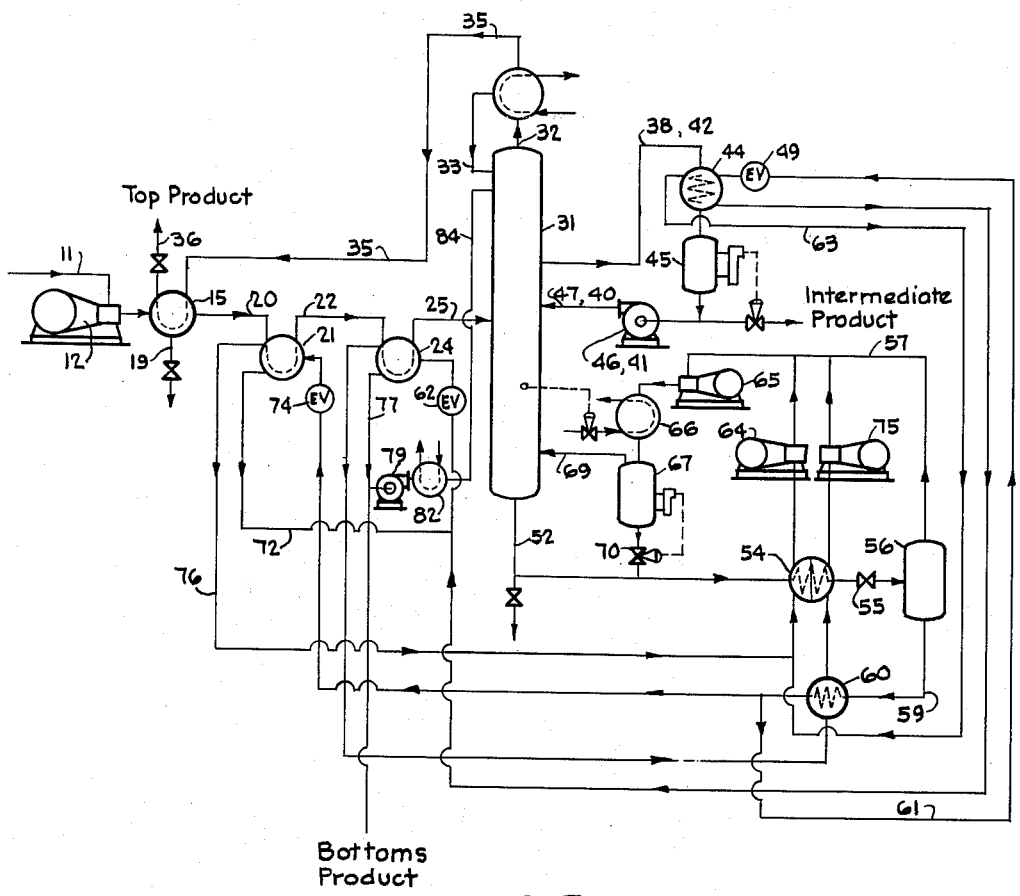
Fig. II

Nov. 1, 1955
P. H. DEMING ET AL
2,722,113
FRACTIONATION PROCESS
Filed Oct. 9, 1951
3 Sheets-Sheet 3
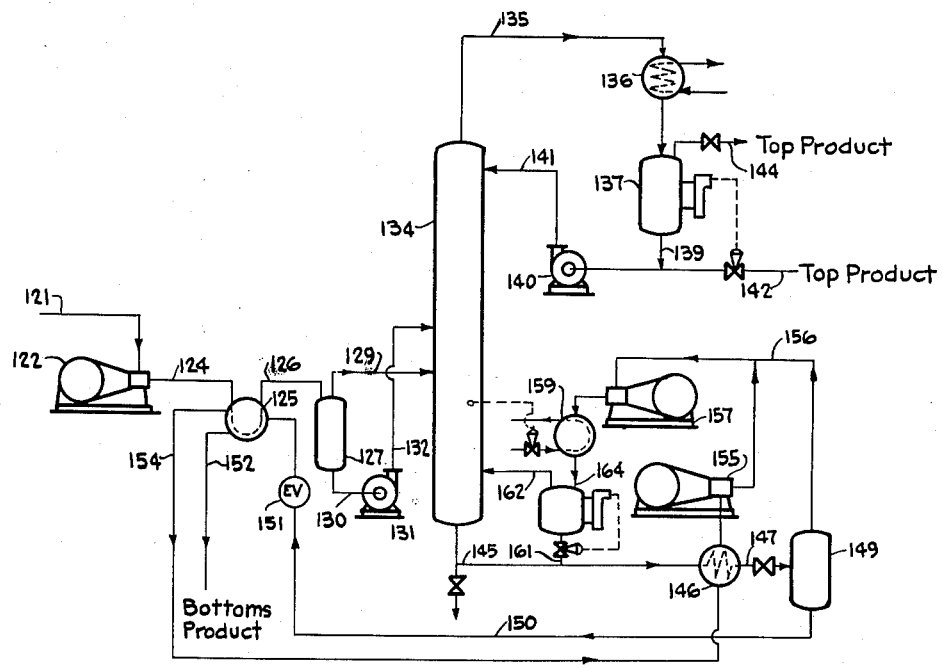
Fig. III
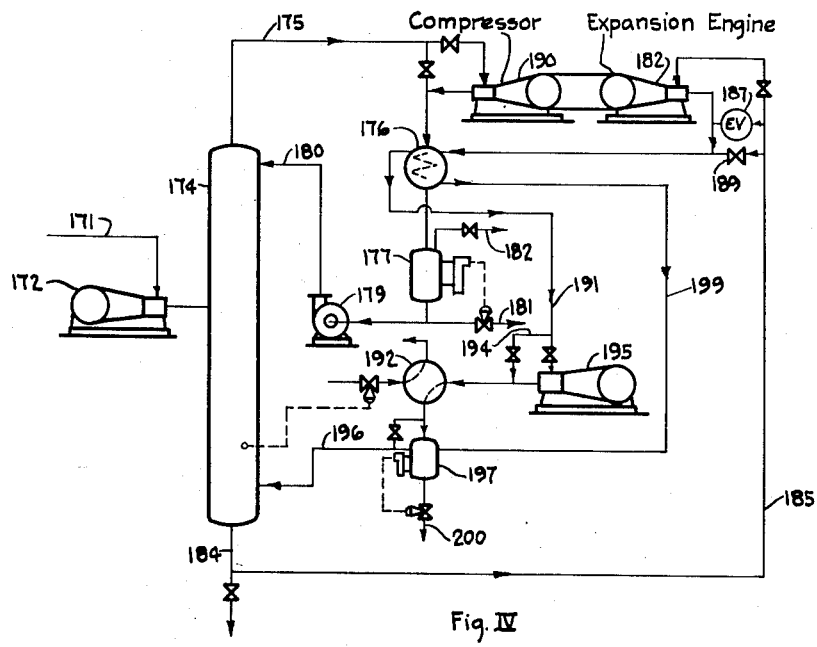
Fig. IV
Inventors: Philip H. Deming
Malcolm L. Sagenkahn
By John H. Colvin
Their Agent

United States Patent Office 2,722,113
Patented Nov. 1, 1955

2,722,113

FRACTIONATION PROCESS

Philip H. Deming, Orinda, Calif., and Malcolm L. Sagenkahn, Dobbs Ferry, N. Y., assignors to Shell Development Company, Emeryville, Calif., a corporation of Delaware Application October 9, 1951, Serial No. 250,496

4 Claims. (Cl. 62—175.5)

This invention relates to a process of separating fluid mixtures comprising or containing components having close boiling points. More particularly, it relates to a process of separating the components of a fluid mixture of hydrocarbons, such as mixtures comprising the lower molecular weight hydrocarbons, as, for example, hydrocarbons having one to five carbon atoms per molecule, which hydrocarbons may be both olefin and paraffins, and which mixture may also contain hydrogen and/or nitrogen.

The effective fractional distillation separation of mixtures of closely boiling substances presents a number of problems, depending on the particular set of circumstances as to the nature of the mixture to be separated and the nature of the various fractions to be recovered. Fundamentally, energy is required to be expended in order to convert a relatively disordered system of different molecular species into a relatively more ordered system of two or more fractions of relatively more similar molecular species. This re-ordering is effected in a plurality of interconnected stages, such as in a fractionation column designed and adapted to provide the equivalent of a plural-stage interconnected fractionation, wherein a plurality of vapor-liquid contacting steps are usually maintained throughout the fractionation column, by providing for an adequate condensate reflux in one end thereof and an adequate vaporized stripping (reboiling) means in the other end thereof. Reflux is usually provided by at least partially condensing the overhead vapor stream and returning a portion or all of the condensate to an upper part of the column. Reboiling or stripping vapors are usually provided simply by revaporizing a portion of the bottoms fraction and returning it to the lower end of the fractionation column.

It is an object of the present invention to provide an efficient process for separating ethylene from a hydrocarbon gas mixture containing principally hydrogen, methane, ethylene, ethane, propylene, propane, butanes and butylenes. It is a further object to separate such a gas mixture into a substantially dry gas fraction, a propane-propylene fraction and an ethane-ethylene fraction. A still further object of the invention is to effect economies and achieve high efficiencies in such separations by utilizing mechanical energy for transferring heat energy from one stage of the process to another stage. Another object is to provide a method for energy balance in a fractionation system wherein a fluid mixture of closely boiling components is separated by fractionation into a vapor stream and a liquid stream with the vapor stream being at a temperature only relatively slightly lower than the temperature of the liquid stream and mechanical energy is utilized for effecting a transfer of heat from the vapor stream to the liquid stream and a portion of one or both of the thus heat-exchanged streams is returned to the fractionation zone as condensate reflux or as vaporized heating medium. Still other objects will become apparent from the hereinafter given description of the invention, which description will be made with particular reference to the drawings, wherein:

Fig. I is a detailed schematic flow diagram of a specific fractionation process which embodies the present invention;

Fig. II is a schematic flow diagram illustrating another embodiment of the invention and is a simplified version of essential elements of the process shown in Fig. I;

Fig. III is a schematic flow diagram of still another embodiment of the invention for the fractionation of an essentially gaseous mixture of volatile substances; and Fig. IV is a schematic flow diagram of a further embodiment of the invention for the fractionation of a mixture of volatile substances.

Now, in accordance with the present invention, a fluid mixture of normally gaseous substances, which may or may not contain readily liquefiable substances, such as a mixture of lower molecular weight hydrocarbons, is subjected to fractional distillation in a fractionation operation to produce separate lower boiling and higher boiling fractions, from the mixture having an intermediate average boiling point, with an indirect transfer of heat from the lower boiling product or from the intermediate boiling mixture to the higher boiling product, and utilization of only a portion of the thus-transferred heat as reboiling means in the fractionation zone to effect stagewise separation of components therein, the indirect heat transfer being effected by first reversing the temperature gradients between the streams to be heat exchanged and then subjecting them to heat exchange through an intervening heat-conducting surface.

Described more specifically, the invention provides an improved process for the separation by fractional distillation of the constituents of a fluid mixture of at least two constituents, or two groups of constituents, of different relative volatilities, such as an ethylene-ethane mixture, a propylene-propane mixture, an ethane-propane mixture and, a $C_1$–$C_4$-hydrocarbons mixture. Thus, a fluid mixture of $C_1$–$C_4$ hydrocarbons which contains first, second and third constituents with decreasing volatilities in the order named, e. g. $C_1$, $C_2$ and $C_3$–$C_4$ hydrocarbons, is separated by a fractionation process comprising the steps: subjecting the mixture to fractional distillation in a fractionation zone; withdrawing therefrom an overhead vapor fraction rich in the first, most volatile constituent; withdrawing from an intermediate portion of the fractionation zone an intermediate vapor fraction of said fluid enriched in the second constituent, or group of constituents, e. g. $C_2$-hydrocarbons; withdrawing from the fractionation zone a bottoms fraction enriched in the third constituent; expanding at least a portion of said bottoms fraction to produce a vaporized bottoms portion having a temperature below the temperature of the withdrawn intermediate vapor fraction, and a residual, cooled liquid bottoms fraction further enriched in the third constituent; effecting heat transfer from at least a portion of the withdrawn intermediate vapor fraction to the vaporized bottoms portion to condense at least part of the intermediate vapor fraction and thereafter returning at least a part of the resulting condensate to the fractionation zone; compressing the resulting heated vaporized bottoms portion to a pressure at least as high and generally somewhat above the pressure in the fractionation zone; at least partially cooling the compressed vapors by transfer of heat therefrom to an extraneous cooling agent; and returning the cooled and compressed vapors to a lower section of the fractionation zone as reboiling means. A portion of the residual, cooled liquid bottoms fraction which was further enriched in the third constituent, particularly where said residual fraction contains heavier and lighter constituents and it is enriched in the heavier constituents, e. g. $C_4$-hydrocarbons, a portion of it is advantageously delivered to an upper section of the fractionation zone as absorbing means for effecting separation between the first and second constituents.

The process of this invention is applicable to those cases wherein a net amount of heat is required to be removed from the mixture to be separated. Thus, the mixture to be separated may be largely in the vapor or gaseous state but composed predominantly of relatively heavier components which are to be recovered in the higher boiling fraction, in which case it will be necessary to extract net heat from the system, only a portion of the heat extractable from the mixture prior to fractionation being required as reboiling heat to effect the desired separation. Also, the separation may be such that the amount of heat required to be extracted from the lighter product, to provide condensate reflux, with or without liquefied lighter product, is in excess of the amount required to be utilized to effect the necessary reboiling in the fractionation operation. Therefore, it becomes necessary to transfer a portion of the heat from the previously heated higher boiling fraction to an extraneous cooling agent prior to utilizing heat taken from the lower or intermediate boiling streams by the higher boiling fraction as reboiling energy.

In the fractional distillation of a mixture of relatively close boiling substances, for example the fractionation of ethylene-ethane mixtures, or of $C_2$–$C_3$ hydrocarbon mixtures, and the like, in a suitably designed fractionation column to effect the desired separation into suitable lower and higher boiling fractions, usually a net amount of heat energy must be supplied to the column in addition to that which is present in the feed mixture, except in those instances when the feed is fed to the column completely or substantially all in the vapor phase. The general practice is to supply this required heat as reboiling heat energy. This can be done effectively by indirectly heating a portion of the withdrawn liquid higher boiling fraction (bottoms fraction) and returning it to the lower section of the column. Heat energy is effectively and efficiently transferred to the portion of bottoms fraction, from all or a portion of the tops fraction and/or from the feed mixture when it is too much in the vapor phase since it is necessary anyway to remove a portion of the heat in said tops fraction or the feed mixture at least to provide or ensure reflux condensate for the efficient operation of the fractionation operation. However, in order to effect such a desired transfer of heat, it is necessary that the relative temperatures of the portions of tops and/or feed and bottoms fractions involved be reversed in order to permit the flow of heat in the required direction. This can be done by compressing the overhead vapor stream, with resultant heating and concomitant elevation of the temperature thereof, and/or by reducing the pressure on the bottoms stream, with resultant at least partial evaporation thereof and concomitant lowering of the temperature. The two streams or portions thereof to be heat exchanged then, or substantially simultaneously with the expansion cooling of the bottoms portion, are subjected to an exchange of heat therebetween, as in a suitable heat exchanger, and the thus heated bottoms portion is returned to the fractionator as reboiling means, after having adjusted the pressure thereof as required to the fractionator pressure.

In many such operations, it is found that the amount of heat which is required to be removed from the vapor stream, together with other amounts added to the bottoms fraction, such as heat energy derived from the mechanical energy of compressing the various streams, particularly when it is desired to recover the overhead stream as a liquid product, or at least largely as liquid, is substantially in excess of the reboiling heat requirements. Consequently, either less heat must be transferred from the overhead stream to the bottoms stream, or, the excess of heat transferred to the bottoms stream must be removed, as by an extraneous cooling agent or medium.

Having set forth the invention in a general manner, there follows now a detailed description of embodiments of the invention with particular reference being made to the accompanying drawing.

Referring to Fig. I, which is a schematic flow diagram of a process of separating mixtures comprising low molecular weight hydrocarbons into desirable fractions of the individual constituents thereof, a stream of gases comprising fixed gases, such as hydrogen and methane, and $C_2$–$C_4$ (lower molecular weight) hydrocarbons possibly together with small proportions of $C_5$-hydrocarbons, including both saturated and unsaturated hydrocarbons, for example, a stream of gases which may be obtained by mixing ordinary refinery gases known as thermal dry gas, ethane cracked gas, and catalytically cracked gas, is introduced to the system by means of a suitable feed line 11, compressor 12, and valved conduit 14. This stream of gases is passed through a heat exchanger 15, wherein it is precooled by heat exchange with colder, unliquefied fixed gas overhead from fractionation of a previous portion of the gas stream. The precooled stream is then introduced by means of a line 16 into a separator 17, from which any liquefied heavier portion of the mixture is withdrawn by means of a valved-line 19. The unliquefied material is then passed serially through two heat exchangers 21 and 24 by means of lines 20 and 22, respectively, wherein the stream is further precooled by heat exchange with expansion-cooled portions of fractions produced from an earlier portion of the gas stream in accordance with the invention as this will be described hereinafter. The thus cooled feed stream is then delivered by line 25 to a separator 26 from which feed material in the gaseous state is fed by way of line 27 to an intermediate section of a fractionator 31 and from which separator the liquefied portion of the feed material is pumped by means of a pump 29 through line 30 into a section of the fractionator 31 above the section to which the gaseous feed is delivered.

The combined feed delivered to the fractionator 31 is separated therein under suitable conditions of pressure and temperature into an overhead fraction containing substantially all of the hydrogen and methane present in the feed, together with a small amount of ethylene, a bottoms condensate fraction containing substantially all the $C_3$ and heavier hydrocarbons in the feed delivered to the fractionator, and a fraction taken from an intermediate section of the fractionator containing substantially all of the ethylene and ethane ($C_2$) and a minor proportion of the propylene ($C_3=$) present in the feed. This separation may be effected, for example, by maintaining the fractionator 31 at a pressure of about 250 p. s. i. a. and a temperature of about $-75°$ F. in the effluent overhead stream and a temperature of about 100° F. at the bottom of the fractionator, with suitable overhead reflux return and bottom reboiling return.

The overhead fraction from the fractionator 31 is withdrawn through a line 32, cooled and partially condensed by heat exchange in a cooler or heat exchanger 34, and the condensed portion of the overhead returned by line 33 to an upper portion of the fractionator 31 as reflux, while the uncondensed portion comprising essentially the hydrogen and methane (and any nitrogen which may be present) is passed through a line 35 to the heat exchanger 15 where it is used to cool the incoming feed. This partial liquefaction of the overhead fraction to produce reflux liquid is accomplished for example by cooling the overhead to a temperature of about $-130°$ F. under a pressure of about 250 p. s. i. a. The effluent gas is then heated in heat exchanger 15 by heat exchange with incoming feed to a temperature of about 70° F. at a pressure of about 240 p. s. i. a. This gas is then discharged from the system as a dry gas by means of a valved line 36. Alternatively, the overhead fraction may be expansion-cooled to a lower pressure and thereby effect a greater cooling of the feed stream in the cooler 15. Furthermore, the overhead stream may be expansion-cooled in an ordinary reciprocating-type expansion engine or in a turbine-type expansion engine to produce either or both the cooling required for the production of reflux for the top of fractionator 31 and the precooling of the feed stream in heat exchanger 15.

A fraction of the feed material is withdrawn from an intermediate section of the fractionator 31 and delivered by means of a suitable line 38 to a fractionation column (a de-ethanizer) 39 from which a bottoms fraction is withdrawn and returned by means of a line 40 and a pump 41 to a lower section of the fractionator 31, while an overhead fraction is withdrawn from this de-ethanizer 39 by means of a line 42. The top effluent temperature of the de-ethanizer is maintained at about $-10°$ F. by cooling the overhead fraction by heat exchange in a condenser 44 to a temperature of about $-10°$ F., thereby partly condensing the overhead, and returning a suitable portion of the condensate as reflux to the top of the de-ethanizer, this being effected by means of a separator 45, a pump 46, and a line 47.

A third fraction (termed a bottoms fraction) of the feed material is withdrawn from a lower section of the fractionator 31 by means of a line 52, cooled by heat exchange in heat exchanger 54, expansion-cooled by passage through expansion valve 55, and delivered to a separator 56 from which vaporized bottoms fraction is withdrawn by means of a line 57, while a further-cooled liquid fraction of the bottoms fraction is withdrawn by means of a line 59. The thus cooled liquid fraction of the bottoms fraction is still further cooled by heat interchange in heat exchanger 60, and then divided into first and second portions. The first portion is delivered via line 61 to expansion device 49, such as an expansion valve or an expansion engine, where it is allowed to expand sufficiently to provide a downward temperature gradient from the ethylene-ethane overhead to the thus expansion-cooled first portion of bottoms fraction. By this means sufficient refrigeration is provided for the ethylene-ethane overhead from the de-ethanizer 39. Uncondensed gases lighter than ethylene are vented from separator 45 by means of a valved-line 50. For most efficient heat recovery the expansion cooling is just sufficient to give the required temperature gradient and so that refrigeration will be by means of heat of vaporization.

The vaporized portion of the bottoms fraction produced in expansion device 49 and condenser 44 is withdrawn via line 63 and further enriched with heat energy by heat exchange with a following portion of bottoms from fractionator 31 in heat exchanger 54, compressed in compressor 64, and combined with the vaporized portion of bottoms in line 57. This mixture is then compressed in compressor 65, suitably cooled in cooler 66 to remove by means of an extraneous cooling agent or medium the amount of heat in the mixture which is in excess of the reboiling requirements in fractionator 31, and separated into condensate and vapor in separator 67, the vapor being returned via line 69 to a lower section of fractionator 31 as reboiling means, while the condensate is combined by means of a valved-line 70 with a following portion of withdrawn bottoms.

The unvaporized and expansion-cooled part of the first portion of bottoms produced in expansion device 49 and condenser 44 is combined in line 72 with a similarly unvaporized and expansion-cooled part of the second portion of the bottoms fraction, produced by passage through an expansion valve 74 and heat exchanger 21, and the combined material is expansion-cooled in expansion valve 62 to provide cooling means in heat exchanger 24 for the incoming feed. The resulting vaporized portion of bottoms from heat exchanger 24 is heated by heat interchange with a subsequent portion of bottoms in heat exchangers 60 and 54, suitably compressed in compressor 75, combined with the vaporized portion of bottoms in line 57, and returned together therewith to the fractionator 31 as reboiling means, as described previously. The resulting vaporized part of the second portion of bottoms fraction produced by means of expansion valve 74 and heat exchanger 21, is withdrawn therefrom by line 76, combined with the vapors withdrawn from condenser 44 through line 63, and subsequently returned to the fractionator bottom as reboiling means as described heretofore.

By means of these unitary and correlated expansion-cooling operations and heat interchanges the lighter portions of the withdrawn fractionator bottoms are effectively separated from the heavier portions, while at the same time precooling of the feed material is accomplished, refrigeration of the ethylene-ethane overhead from the de-ethanizer is provided, the required portion of the recovered energy is supplied to the fractionator for reboiling means, and stripping gases are produced and delivered to the fractionator.

The portion of the bottoms fraction which remains unvaporized throughout the operations described hereinbefore is withdrawn from the heat exchanger 24 by means of line 77, and delivered to pump 79, from which a portion is delivered by line 80 to a propylene fractionator 81 for the separation of $C_3$ and $C_4$ fractions. The remainder of the unvaporized material is further cooled by heat interchange, for instance in a heat exchanger 82 and delivered therefrom by means of line 84 to an upper section of fractionator 31 to function as lean oil therein to effect absorption of $C_2$ hydrocarbons from the fixed gases. Thus, this process also effectively provides lean oil for absorption in the upper section of fractionator 31, along with the other provisions enumerated above.

The above operations and the indicated economies may be suitably effected in the following manner: Referring again to Fig. I, a bottoms fraction is withdrawn at about $100°$ F., cooled to about $65°$ F. in heat exchanger 54, and expansion-cooled in expansion device 55 to a temperature of about $30°$ F. Liquid at about $30°$ F. is withdrawn from separator 56, further cooled in heat exchanger 60, and divided into first and second portions: The first portion is expansion-cooled in expansion device 49 and, after being used as refrigerating means in condenser 44, is withdrawn therefrom as separate vapor and liquid fractions at about $-28°$ F. The second portion of the precooled bottoms fraction is expansion-cooled in expansion device 74, is used to precool feed in exchanger 21 and then withdrawn therefrom as separate vapor and liquid fractions at about $-28°$ F. The liquid or unvaporized fractions from exchangers 44 and 21, at a temperature of about $-28°$ F. are combined and expansion-cooled in device 62, utilized to produce further precooling of feed in exchanger 24 and withdrawn from exchanger 84 as separate vapor and liquid fractions at about $-60°$ F. The vapor fractions from exchangers 44, 24 and 21 are used as precooling means for a fractionator bottoms portion and thereby are heated to about $80°$ F. in exchangers 60 and 54. After suitable subsequent compression, such as by means of compressors 64, 75 and 65, to restore the pressure thereof to the pressure in the fractionator 31 so that at least a portion thereof can be returned thereto, suitably cooling in cooler 66 to remove any undesirable and excess heat, over that which it is desired and required to supply to fractionator 31 for reboiling purposes, mixing with vapor fraction from separator 56, and separation of condensate, the resulting heated and compressed vapor stream is delivered to the bottom of fractionator 31 at about $100°$ F. and a pressure of 275 p. s. i. a. The liquid (unvaporized) portion of bottoms fraction which is withdrawn from exchanger 24 at about $-60°$ F. is divided into two portions. One portion is further cooled in exchanger 82 to about $-85°$ F. and delivered at that temperature to the top of the fractionator 31 as lean oil. This fraction comprises essentially $C_3$ and $C_4$ hydrocarbons. The remainder is fractionated in propylene fractionator 81 into a propylene-propane fraction containing about 10% ethane, and a butane-pentane fraction. For this separation, the overhead condensation and the reflux return are provided by conventional water-cooled condenser 86, accumulator 87, pump 89, and reflux return line 90. Reboiling is provided by a suitable reboiler 91, a $C_4$–$C_5$ fraction being withdrawn by means of a valved line 92.

Returning to the separation of the ethylene fraction, the portion of the ethylene-ethane condensate collected in accumulator and separator 45 which is not returned as reflux to de-ethanizer 39 is delivered by means of pump 46 and line 94 to an ethylene fractionator 95 wherein it is fractionated into an overhead ethylene fraction and a bottoms ethane fraction. The overhead is withdrawn through line 96, refrigerated and partially condensed in 97, and separated in separator and accumulator 99 into a condensate fraction which is withdrawn therefrom and returned to the top of fractionator 95 by means of pump 11 and line 101, and into a gaseous fraction which is substantially completely composed of $C_2$-hydrocarbons, about 95% of which is ethylene while the remainder is substantially all ethane. This ethylene fraction is withdrawn by means of a valved-line 102. The bottoms fraction from the ethylene fractionator is expansion-cooled in expansion device 104 to give a small downward temperature gradient from the overhead in line 96 to the thus expansion-cooled bottoms, and it is then used in condenser 97 as condensing means for at least a portion of the overhead. The bottoms fraction is thus separated into two separate fractions, a vaporized fraction which is withdrawn from condenser 97 by line 105, and a liquid (unvaporized) fraction which is withdrawn by line 106. A portion of the vaporized fraction is compressed in a compressor 108 back up to the pressure in fractionator 95 and consequently at the same time heated (by compression) and then returned to the bottom of the fractionator as reboiling means as well as stripping agent for the material in the lower section of the fractionator. The remainder is withdrawn through valved-line 107 as a substantially 95% ethane fraction. The unvaporized part of the bottoms fraction in line 106 is further cooled in heat exchanger 109 and then expansion-cooled in expansion device 111 to provide sufficient cooling in exchanger 82 for the lean oil fraction to be returned to the top of fractionator 31. The resulting vaporized part of the ethane fraction from the ethylene fractionator 95 is thus made available in valve-line 112. The liquid (unvaporized) part which is withdrawn from the exchanger 82 at a temperature substantially below the —85° F. of the lean oil is further suitably expansion-cooled in device 114 to provide the required cooling and therefore condensation for reflux of overhead from fractionator 31 in cooler 34. The ethane material is then delivered by means of line 115 to exchanger 109 where it serves as precooling means for a subsequent or following portion of the same steam, and it is then made available in valved line 116. Suitable conditions for this series of coordinated operations are as follows: The ethylene fraction is taken overhead from the fractionator 95 at a temperature of about —27° F. at a pressure of about 250 p. s. i. a. The ethane bottoms is expansion-cooled to give vaporized and liquid portions withdrawn from condenser 97, of about —47° F. at about 100 p. s. i. a. The liquid portion is further cooled to about —75° F. in exchanger 109, and expanded to about 27 p. s. i. a. in expansion valve 111. The ethane liquid withdrawn from exchanger 82 is at about 27 p. s. i. a. and —105° F. It is expansion-cooled to about 10 p. s. i. a. in expansion device 114 to give a temperature of about —140° F. in line 115 and a temperature of about —65° F. at 10 p. s. i. a. in line 116.

Any one or all of the fluid steams which are cooled by expansion may be made to do work at the same time by allowing the fluid to expand in an expansion device such as an expansion engine. The useful work which is thus made available may be utilized in connection with the operation of any of the compressions in the process, such as in compressors 64, 65, 75 and 108.

Fig. II illustrates another embodiment of the invention, representing a simplified version of essential elements of the process shown in Fig. I in combination according to the invention. The essential difference is the omission of the intermediate fractionator (de-ethanizer) 39. The subsequent fractionations of the ethylene-ethane and of the $C_3$–$C_4$ streams have also been omitted so that the essential features will be more clearly emphasized. Various pieces of equipment, including transfer lines, pumps, heat exchangers, compressors, expansion devices, fractionators, accumulators and the like are identified by the same numerals which are employed to identify corresponding elements of Fig. I. The hereinbefore given description of the process flow made with reference to Fig. I may also be read with reference to Fig. II for the most part. Referring specifically to Fig. II, the precooled feed stream in line 25 is fed directly to the fractionator 31. The liquid portion of bottoms fraction withdrawn from the second stage feed precooler 24 in line 77 is delivered by pump 79 and any required cooler 82 to the top of fractionator 31 as lean absorption oil. The essentially $C_2$ stream withdrawn from an intermediate section of fractionator 31, as indicated by lines 38, 42 (combination of lines 38 and 42 of Fig. I) is condensed in heat exchanger 44 by heat exchange against expansion-cooled portion of bottoms fraction in line 61 and a portion of the resulting condensate is returned to the fractionator 31 by lines 47, 40.

A further embodiment of the invention is illustrated in Fig. III, which indicates equipment set-up and the process flow which can be carried out in its use, for the fractionation of an essentially vaporous feed material containing a major proportion of components which it is desired to recover in a liquid bottoms product, and in which process it is desired to provide a large portion of the cooling, which is required for the effective fractionation in the fractionator, by adequately cooling the feed mixture and at the same time transferring a portion of the heat thus extracted from the feed to the lower section of the fractionator for reboiling service.

Referring now to Fig. III, a suitable gas mixture is provided in line 121 at a suitable pressure, for example a $C_2$–$C_3$-hydrocarbon mixture which may be a mixture for the most part of ethylene and ethane with a relatively high proportion of ethane and containing substantial but minor amounts of $C_3$-hydrocarbons, particularly propylene, and from which mixture it is desired to recover an ethylene overhead product stream with the higher boiling ethane and $C_3$-hydrocarbons being recovered as a liquid bottoms product. The gas feed mixture is suitably compressed by compressor 122 and delivered by line 124 to heat exchanger 125 wherein it is suitably cooled and refrigerated to the dew point thereof and a portion thereof condensed, the cooling generally being sufficient to liquefy essentially all of the ethane and heavier hydrocarbons, that is, the components which it is desired to separate as liquid bottoms. The mixture in line 126 is delivered to a separator 127 wherein the vapor and liquid phases are at least partially separated. The vapor phase is delivered by line 129 to an intermediate section of the fractionator 134 while the liquid phase is delivered by line 130, pump 131 and line 132 to the fractionator 134 at a point somewhat above the feed point for the vapor phase. An overhead vapor stream is removed by line 135 and suitably condensed in heat exchanger 136, at least sufficient to provide the required reflux in fractionator 134. The at least partially condensed stream is collected in accumulator 137, from which condensate is withdrawn by line 139, a part being returned by pump 140 and line 141 to the top of fractionator 134 as reflux, the remainder being withdrawn through liquid-level controlled valved-line 142. The uncondensed portion of the overhead stream is withdrawn from accumulator 137 via valved-line 144. Heat exchanger (condenser) 136 is provided with any suitable cooling medium, as indicated, which may include an expansion-cooled portion of a higher boiling fraction removed from a section of the fractionator 134 at a point substantially below the overhead exit. A bottoms liquid stream is withdrawn by line 145, heated somewhat in heat exchange 146 against a subsequently heated portion thereof, as described hereinafter, and passed to a separator 149 through a valved-line 147, which valve may be adapted to effect an expansion of the stream in addition to controlling fluid flow. The liquid phase which is separated in separator 149 is passed through line 150 and a suitable expansion device 151, such as an expansion valve or an expansion engine, to the heat exchanger (feed precooler) 125. The liquid fraction of the bottoms is expanded sufficiently in expansion device 151 to result in partial vaporization of the bottoms fraction and a reduction of the temperature thereof sufficiently below the temperature of the feed stream in line 124 to refrigerate the feed stream adequately to prepare it for delivery to the fractionator 134. The resulting liquid portion of the bottoms fraction in heat exchanger 125 is withdrawn by line 152, as a bottoms product. The vaporized portion is withdrawn by line 154, heated by heat exchange in exchanger 146 against a following portion of bottoms in line 145, compressed in compressor 155 to the pressure of vaporized portion of bottoms withdrawn from separator 149 in line 156, and combined with the vapors in line 156. The combined stream of the two vapor fractions in line 156, at a lower pressure than the pressure in the fractionator 134, is compressed by compressor 157 to a pressure at least slightly and preferably substantially (10 p. s. i. or more) above the pressure in the fractionator. The compressed vapor stream, containing an excess of heat over the amount required for reboiling purposes in the fractionator, is cooled in heat exchanger (cooler) 159, against an extraneous cooling agent, resulting condensed phase is separated in separator 160 and added to the bottoms stream in line 145 by means of liquid level-controlled valved-line 161, and the resulting regulated stream of bottoms vaporized portion is delivered by line 162 to the fractionator 134. The cooling of the bottoms vaporized portion in heat exchanger 159 is controlled by any suitable means, such as a control on the valved line which controls the flow of the cooling agent through the heat exchanger, which valve control is made responsive to changes in temperature at some selected point of the fractionator, as indicated. When the control on the amount of cooling effected in the heat exchanger 159 is effected by flow control of the cooling agent, it will be understood that the cooling agent is supplied at a substantially constant temperature sufficiently lower than the desired temperature of the reboiling medium. Methods of such control are available and can be used as will be readily understood. It will also be understood that the cooled stream in line 164, including both vapor and liquid phases, can be delivered directly to the fractionator without first separating the condensed phase therefrom.

A still further embodiment of the invention is illustrated in Fig. IV, which shows the equipment arrangement and process flow which can be carried out in its use, for the fractionation of a mixture of relatively close boiling components, wherein it is desired to obtain one liquid or liquefied product stream which is enriched in relatively lower boiling components and another liquid product stream which is enriched in relatively higher boiling components, and in which process it is desired to utilize a portion of the product stream which is enriched in higher boiling components to provide essentially all of the direct refrigerating or cooling requirements for condensation of essentially all of the product stream which is enriched in lower boiling components when it is separated in the vapor state, and a portion of the heat thereby absorbed by the higher boiling product stream is utilized to provide the reboiling requirements of the fractionation.

Referring now to Fig. IV, a suitable volatile mixture, generally predominantly in the vapor state, is delivered continuously by line 171 and compressor 172 to a suitably designed fractionation column 174, and the mixture is suitably fractionated therein into an overhead vaporous stream and a bottoms liquid stream. In the operation, the overhead vaporous stream in line 175 is adequately condensed, preferably substantially completely, in heat exchanger (condenser) 176, the resulting condensate is collected in accumulator 177, a portion thereof is returned by pump 179 and line 180 to an upper point in fractionator 174 as condensate reflux, and the remainder of the condensed overhead stream is withdrawn by valve-controlled line 181. Uncondensed material is vented or withdrawn by valved-line 182. The liquid fraction which collects in the bottom of the fractionator 174 is withdrawn by line 184, at least a portion thereof is transferred by line 185 to the overhead condenser 176, either via an expansion device, such as an expansion engine 186, an expansion valve 187, or a flow control valve 189. In order to provide a temperature drop from the overhead stream in line 175 to the portion of bottoms stream in line 185, either the overhead stream must be heated or the bottoms stream must be cooled; both may be effected. Since the overhead stream in line 175 is near or at the dew point thereof, it can be effectively and efficiently supplied with additional heat energy by the expenditure of mechanical energy of compression as in compressor 190, with an elevation of the temperature of the overhead stream such that it is sufficiently higher than the temperature of the bottoms stream in line 185 so that transfer of heat from the overhead stream to the bottoms stream is readily effected in heat exchanger 176, with the resultant condensation of the overhead stream and at least partial vaporization of the bottoms stream. Alternatively, since the bottoms stream in line 185 is essentially at its boiling temperature at the pressure in the fractionator, a release of the pressure thereon, as in an expansion engine 186 or an expansion valve 187, results in an effective lowering of the temperature thereof concomitant with vaporization of at least a portion thereof. The portion of the bottoms stream in line 185 can be controlled, in coordination with the expansion thereof and/or heating thereof in heat exchanger 176, so that all of said portion is in the vapor phase as it leaves the heat exchanger 176. The resulting heated vapor portion of the portion of bottoms fraction is delivered by line 191 to a heat exchanger (cooler) 192, either by line 194 or via compressor 195, as required. It will be understood that compressor 195 is utilized when necessary to raise the pressure of the returning stream to a value sufficiently high to permit its return to the fractionator 174. The heated vapor portion of the bottoms fraction is cooled by an extraneous cooling agent in heat exchanger 192 to remove the amount of heat therein which is in excess of the reboiling requirements of the fractionator and it is then delivered to the fractionator by line 196, after having been separated from any condensate therein if desired, as by separator 197. The liquid portion of the bottoms fraction which is separated in heat exchanger 176 is withdrawn by line 199 and delivered to accumulator and separator 197, from which separated liquid phase is suitably withdrawn as a final bottoms product by means of liquid level-controlled valved-line 200. The control of the cooling effected in heat exchanger 192 is similar to that in heat exchanger 159 of Fig. III.

A process of the character contemplated in the present invention involves a number of variable factors, the proper coordination and correlation of which are essential for economical and efficient operation. Thus, in effecting a transfer of heat energy from a column overhead to a column bottom it is necessary either first to raise the temperature of the overhead so that it is higher than that of the bottoms, for example by compression-heating, or else lower the temperature of the latter to a value below that of the overhead, for example by expansion-cooling. In utilizing compression-heating and expansion-cooling to effect these temperature changes and then taking advantage of the desirable temperature gradient in the subsequent heat transfer therebetween, cognizance must be taken of the relative efficiencies involved in the individual steps and the sum total of the combined operation.

The present invention is thus a coordinated and unitary sequence of operational steps in which overall maximum efficiencies of energy transfer and component separations are accomplished.

This application is a continuation-in-part of copending application Serial No. 670,941, filed May 20, 1946, now Patent No. 2,577,701, issued December 4, 1951.

We claim as our invention:

1. A process of separating constituents of a vaporous mixture (a) by fractional distillation comprising the steps of precooling and partially condensing the vaporous mixture (a) by heat exchange against an expansion-cooled portion (b) of a liquid bottoms fraction (c) produced in the process, as described hereinafter, subjecting the resulting partially condensed mixture (d) to fractional distillation in a fractionation operation, separately withdrawing therefrom a vapor fraction (f) and a liquid bottoms fraction (c), the temperature $T_1$ of the vapor fraction being lower than the temperature $T_2$ of the bottoms fraction, utilizing a portion (b) of said bottoms fraction (c) for the hereinbefore described precooling of the vaporous mixture (a), recompressing at least the resulting thus-heated vapor portion (e) of bottoms fraction (c) from said precooling utility, transferring heat therefrom to an extraneous cooling agent to reduce the temperature of compressed vapor portion (e) and separating resulting condensate (g) from remaining vapor portion (h), and using the vapor portion (h) to supply heat to the fractionation operation.

2. In a process of separating by fractionation constituents of a fluid mixture wherein there are first, second and third constituents with decreasing volatilities in the order named, the steps comprising: subjecting the fluid mixture to fractional distillation in a fractionation zone; withdrawing therefrom an overhead vapor fraction rich in the first, most volatile constituent; withdrawing from an intermediate portion of the fractionation zone an intermediate vapor fraction of said fluid enriched in the second constituent and at a temperature $T_1$; withdrawing from the fractionation zone a bottoms fraction enriched in the third constituent and at a temperature $T_2$; expansion-cooling at least a portion of said bottoms fraction to a temperature $T_3$ below the temperature $T_1$ of said withdrawn intermediate vapor fraction, effecting heat transfer from at least a portion of said withdrawn intermediate vapor fraction to said expansion-cooled portion of said bottoms fraction to condense at least part of said intermediate vapor fraction and to produce a vaporous portion of said expansion-cooled portion of bottoms fraction and a cooled liquid bottoms fraction further enriched in the third constituent; returning at least a part of the resulting condensate of the intermediate vapor fraction to the fractionation zone; compressing the resulting heated vapor fraction of the expansion-cooled portion of bottoms fraction and at least partially cooling the compressed vapors by transfer of heat to an extraneous cooling agent and separating resulting condensate from remaining vapor portion; and returning said remaining vapor portion to a lower section of the fractionation zone as reboiling means.

3. A process of separating constituents of a vaporous mixture (a) by fractional distillation comprising the steps: (1) precooling and partially condensing the vaporous mixture (a) by heat exchange against an expansion-cooled portion (b) of a liquid bottoms fraction (c) produced in the process, as described hereinafter, whereby vaporous mixture (a) forms a partially condensed mixture (d) and a vapor portion (e) is formed from portion (b); (2) subjecting the partially condensed mixture (d) to fractional distillation in a fractionation operation; (3) separately withdrawing therefrom a vapor fraction (f) and a liquid bottoms fraction (c); (4) separating said bottoms fraction (c) into a vapor friction (g) and a liquid fraction (h); (5) utilizing the separated liquid friction (h) for hereinbefore described precooling of the vaporous mixture in step (1); (6) compressing the vapor portion (e) produced in step (1); (7) combining the thus-compressed vapor portion (e) with the vapor fraction (g) and compressing the combined vaporous material (j) still further; (8) transferring heat therefrom to an extraneous cooling agent to reduce the temperature of compressed mixture (j) and separating resulting condensate (l) from remaining vapor portion (k); and (9) using the resulting vapor portion (k) to supply heat to the fractionation operation; the removal of heat in step (8) being adjusted in accordance with changes in temperature in the lower section of the fractionation zone, the amount of heat removed being increased when the temperature in the fractionation zone rises and being decreased when the temperature decreases, thus maintaining substantially uniform temperature conditions in the lower section of the fractionation zone.

4. A process of separating constituents of a vaporous mixture (a) by fractional distillation comprising the steps: (1) precooling and partially condensing the vaporous mixture (a) by heat exchange against an expansion-cooled portion (b) of a liquid bottoms fraction (c) produced in the process, as described hereinafter, whereby vaporous mixture (a) forms a partially condensed mixture (b) and a vapor portion (e) is formed from portion (b); (2) subjecting the partially condensed mixture (d) to fractional distillation in a fractionation operation; (3) separately withdrawing therefrom a vapor fraction (f) and a liquid bottoms fraction (c); (4) separating said bottoms fraction (c) into a vapor fraction (g) and a liquid fraction (h); (5) utilizing a portion (i) of the separated liquid fraction (h) for hereinbefore described precooling of the vaporous mixture in step (1); (6) expansion-cooling a further portion (j) of the separated liquid fraction (h) to a temperature below the temperature of the vapor fraction (f) withdrawn from the fractionation operation in step (2) and heat exchanging it against at least a portion of the vapor fraction (f) to partially condense it and to form thus-heated vapor (k) and liquid (l) from said further portion (j); (7) returning at least a portion of the condensate of fraction (f) to the fractionation zone as reflux; (8) combining the vapor portion (e) from step (1) with the vapor (k) from step (6) and compressing the mixture to the pressure of the vapor fraction (g) from step (4); (9) compressing the combined vaporous material (m) from step (8); (10) transferring heat therefrom to an extraneous cooling agent to reduce the temperature of compressed material (m) and separating resulting condensate (o) from remaining vapor portion (n); and (11) using the resulting vapor portion (n) to supply heat to the fractionation operation; the removal of heat in step (10) being adjusted in accordance with changes in temperature in the lower section of the fractionation zone, the amount of heat removed being increased when the temperature in the fractionation zone rises and being decreased when the temperature decreases, thus maintaining substantially uniform temperature conditions in the lower section of the fractionation zone.

UNITED STATES PATENTS

References Cited in the file of this patent

| | | |
|---|---|---|
| 1,426,461 | Claude | Aug. 22, 1922 |
| 2,040,116 | Wilkinson et al. | May 12, 1936 |
| 2,327,643 | Houghland | Aug. 24, 1943 |
| 2,475,957 | Gilmore | July 12, 1949 |
| 2,577,701 | Deming et al. | Dec. 4, 1951 |
| 2,600,110 | Hachmuth | June 10, 1952 |
| 2,619,814 | Kneil | Dec. 2, 1952 |

FOREIGN PATENTS

| | | |
|---|---|---|
| 182,711 | Switzerland | May 16, 1936 |